United States Patent [19]

Friedman et al.

[11] 4,371,562
[45] Feb. 1, 1983

[54] METHOD FOR IMPROVING THE FUNCTIONALITY OF PROTEIN MATERIALS

[75] Inventors: Herman H. Friedman, Forest Hills; Joseph Giacone, Purdy's; Charles J. Cante, Pleasantville; John R. Frost, Beacon, all of N.Y.

[73] Assignee: General Foods Corporation, White Plains, N.Y.

[21] Appl. No.: 271,158

[22] Filed: Jun. 8, 1981

Related U.S. Application Data

[63] Continuation-in-part of Ser. No. 85,183, Oct. 16, 1979, abandoned.

[51] Int. Cl.³ ............................................. A23K 1/00
[52] U.S. Cl. ................................. 426/656; 426/657; 426/802; 426/805
[58] Field of Search ............... 426/656, 657, 455, 802, 426/805

[56] References Cited

U.S. PATENT DOCUMENTS

| | | | |
|---|---|---|---|
| 3,119,691 | 1/1964 | Ludington et al. | 426/805 X |
| 3,806,611 | 4/1974 | Sawada et al. | 426/802 X |
| 3,962,481 | 6/1976 | Kumar | 426/656 X |
| 4,018,909 | 4/1977 | Foulkes | 426/805 X |

*Primary Examiner*—Arthur L. Corbin
*Attorney, Agent, or Firm*—Thomas R. Savoie; Daniel J. Donovan

[57] ABSTRACT

A high polymer material, e.g. polyvinylpyrrolidone, is mixed with an aqueous protein slurry composed of helical protein molecules. The pH of the slurry is then raised to about 8 to 12 to allow ingress of the high polymer material internally in the protein molecules. Thereafter, the slurry pH is reduced to about 5 to less than 8 to entrap a portion of the high polymer material within the protein molecules.

8 Claims, No Drawings

METHOD FOR IMPROVING THE FUNCTIONALITY OF PROTEIN MATERIALS

This application is a continuation-in-part of Ser. No. 085,187, filed Oct. 16, 1979, now abandoned.

DESCRIPTION

TECHNICAL FIELD AND DISCLOSURE OF THE INVENTION

The present invention provides a process for functionally improving protein materials, and products produced according to this process.

While protein plays an essential role in human and animal nutrition, it is not of great importance nutritionally as to the exact source of the protein materials. What is important to proper growth and nutrition is that the protein be supplied in the diet in sufficient quantities and with an adequate balance of the essential amino acids. Thus, it is not important for nutrition that great quantities of meat be consumed where the diet contains other nutritional proteins.

Through the years, the diets of humans and domesticated pets such as dogs and cats have relied heavily upon meat as the source of protein. This is probably due to its taste and availability. Unfortunately, it is fairly well established that our reliance upon meat as a source of protein is ecologically inefficient. Animals convert vegetable protein into meat protein in an extremely inefficient manner. Moreover, it has become apparent that the continued reliance upon meat in such diets will soon become economically inefficient.

To avoid the problems associated with the use of meat as a prime protein source, there have been many attempts in recent years to convert vegetable protein directly into food products which have the appearance and general attractiveness of meat. While these attempts have been successful to a good degree, they all rely upon the use of highly functional protein. That is, in order to provide meat simulating products from vegetable protein materials, the vegetable protein must either have the ability to be processed to form highly cohesive and resilient products, or it must be employed in combination with a binder material which will supply these important functional characteristics. And, even where a protein is highly functional, the use of it with other necessary dietary components such as non-proteinaceous filler materials, such as starches, flours, and bulk density fibers, may substantially decrease the overall meat-like characteristics of the product prepared from it.

Among the properties important when a meat substitute for human consumption is desired, are the properties of resilience, bite resistance, fibrosity and cohesiveness. On the other hand, when the dry, crunchy characteristics familiar to dry pet foods are desired, it is important to have a product of a relatively high degree of expansion, good hardness, and the capability of being rehydrated without becoming mushy.

The need for functional protein presents another supply problem. Those vegetable protein raw materials, concentrates and isolates which are highly functional are in great demand and relatively high in cost, while relatively non-functional, but nutritionally good proteins are now being inefficiently utilized.

The problems associated with protein functionality have a staggering impact on the world's ability to provide adequate nutrition to all of its inhabitants in forms which are attractive and palatable. There is clearly a present need in the art to improve the functionality of a wide variety of protein materials.

DISCLOSURE OF THE INVENTION

Accordingly, it is an object of the present invention to provide a process capable of improving the functional characteristics of protein materials.

It is a function of the present invention to provide a process capable of improving the cohesiveness of products prepared from proteinaceous materials.

It is a function of the present invention to provide a process for improving the hydration resistance of dry protein based pet foods.

It is still another function of the present invention to provide a process for treating a proteinaceous material which will improve the expansion of products prepared therefrom.

It is a yet further function of the present invention to provide a process for improving the hardness of dry protein based products.

It is another function of the present invention to provide a process for treating proteinaceous material which will affect the density of products thereby allowing another degree of process control.

It is a further aspect of the present invention to provide a process for increasing the water binding capability of protein materials.

It is another aspect of the present invention to provide a process for treating a protein material which will improve the efficiency with which that material can be ultimately processed such as by extrusion.

These and other objects are accomplished according to the present invention which provides a method for functionally improving a protein material comprising contacting the protein with an aqueous, alkaline media containing a water-dispersible high polymer material to form a non-solubilized mixable protein slurry composed of helical protein molecules which has the high polymer material dispersed in said slurry, and then reducing the pH of the combined mixture of protein and aqueous media to a level effective to entrap a portion of the high polymer material within the helical protein molecule.

The present invention is concerned with improving the functionality of protein materials. It is especially useful for low quality proteins which are to be employed in extrusion procedures for forming food products. These extrusion procedures are carried out at elevated temperatures and pressures. The temperature will be at least high enough to coagulate the protein and typically will be in excess of about 100° C. Pressure drops from the extruder that are low enough to simply enable expulsion of the product can be employed but typically vary from a few atmospheres up to as high as about 50 atmospheres. Generally, those products extruded at pressures above 7 atmospheres have a highly expanded texture. Processes involving extrusion without expansion are shown in U.S. Pat. Nos. 3,814,823 to Yang and 3,866,299 to Feldbrugge et al. Typical of the processes which extrude under relatively high pressures to form an expanded product are U.S. Pat. Nos. 3,488,770 to Atkinson, and 3,940,495 to R. J. Flier. Also representative of processes which can be improved by employing protein materials processed in accordance with the present invention are those for preparing expanded dry pet foods such as described in U.S. Pat. Nos. 3,119,691 to Ludington et al, 3,447,929 to Hale, and 3,139,342 to Linskey. In addition, processes which use solubilized protein slurries to form meat analogs are represented by U.S. Pat. Nos. 3,806,611 to Swada et al, 3,962,481 to Kumar and 4,018,909 to Foulkes.

For the purpose of simplifying the following disclosure, but with no intention of being limited to compositions of a particular type, the following detailed description will be directed to the preparation of a dry expanded pet food of the type described in the above-referenced Ludington et al patent. The disclosures of all of the above-referenced patents are incorporated by reference herein to show the detail of other suitable product forms and processing schemes, it being understood that in each case the protein or a portion of it as is called for by those references can be proteinaceous materials treated according to the present invention.

BEST MODE FOR CARRYING OUT THE INVENTION

According to a preferred embodiment, a dry, particulate, porous, expanded pet food product is prepared from a mixture comprising farinaceous and proteinaceous materials wherein at least a portion of the proteinaceous materials are treated in accordance with the present invention. The proteinaceous ingredients used in the mixture may be of vegetable or animal origin, and typically include soy bean meal, soy grits, meat meal or fish scrap. Typically, the proteinaceous ingredients comprise from about 20% to 50% by weight of the total mixture.

The farinaceous ingredients employed according to this embodiment may be wheat, corn, barley, oats, their derivatives such as corn meal, hominy, and other like ingredients. Typically, the total amount of farinaceous ingredients based on the weight of farinaceous/-proteinaceous mixture is between 35% to 70% by weight.

The balance of the mixture may comprise salts, flavorings, colorings, vitamin supplements and other like ingredients to form a nutritionally balanced animal food product.

In preparing an animal food according to the teachings of the present invention, at least a portion of the proteinaceous materials are processed to improve their functional properties. To accomplish this, a non-solubilized mixable protein slurry composed of helical protein molecules is formed. Thereafter a water-dispersible, high polymer material is mixed with the protein slurry. Following this, the pH of the total mixture is reduced to a level effective to entrap a portion of the high polymer within the helical protein molecule.

Typically, the protein material such as soy grits or soy bean oil meal are added to a mixing vessel along with sufficient water to form a mixable slurry. Preferably, the protein material will be present in an amount greater than 10% and preferably from about 10 to about 50% and even more preferably 10–40% by weight of the slurry. The solids concentration of the slurry will be greater than 20% and preferably greater than 40%.

The water-dispersible high polymer material is mixed with the slurry to cause complete dispersion. While in most cases it is preferable to add and disperse the high polymer material prior to raising the slurry pH to within the alkaline range, it may sometimes be desirable to reverse the order of addition and add sufficient amounts of a base to raise the pH prior to addition of the high polymer material. It is also desirable in some situations to add both the base and the high polymer material at the same time.

Once slurried, the ingredients are maintained under sufficient agitation for a period of time sufficient to allow the high polymer material to come into close association with the alkaline treated protein wherein the helical protein molecule has become unfolded and opened sufficiently to allow partial ingress of the high polymer internally in the helical molecule. After a sufficient period of holding in contact in this manner, the pH of the solution is reduced to a level effective to entrap a portion of the high polymer material within the protein helix. Typically, the pH is reduced to on the order of from about pH 5 to less than pH 8.

The following hypothesis is used to explain the phenomena of entrapping a portion of the polymer material within the protein helix. However, this hypothesis of the existence and mechanism by which the invention may operate is not designed to limit the scope of the present invention, but is advanced only as a means of explaining the effects produced. Entrapping a portion of the polymer material in the protein helix is thought to sterically hinder the return of the protein structural confirmation to its original orientation.

Among the bases suitable for increasing the pH of the solution according to the present invention are potassium hydroxide, sodium carbonate, sodium bicarbonate, ammonium hydroxide, sodium hydroxide, calcium hydroxide and the like. Sodium hydroxide and calcium hydroxide are most desirably employed. The base should be employed in sufficient amounts to raise the pH of the slurry to well within the alkaline range, of pH 8 to 12 and preferably in the range of from about pH 9 to pH 10. The entire alkaline range of from about pH 8 to approaching pH 14 is, however, useful to varying degrees and therefore can be employed according to the present invention. To date, the best results have been achieved at pH values of around 9, and this level is therefore considered preferred. It is possible and indeed likely, however, that proteinaceous materials in combination with high polymer materials other than those specifically employed in the tests referred to will show optimum results at levels different from this.

The base is added in sufficient quantities to allow the helical protein molecule to unfold and open sufficiently to allow partial ingress of the high polymer internally in the helical molecule. The solids concentration of the slurry is maintained greater than 20% and more preferably greater than 40% based upon weight. The slurry is not solubilized in the manner as customarily done to prepare a spinning solution as taught by the prior art cited herein. If a spinning solution is prepared, the protein, by virtue of being solubilized, will not permit the ingress of the high polymer material into the helical molecule. Rather the solubilized protein will merely be suspended with the high polymer material in solution. Upon acid coagulation of the spinning solution, fibers will be formed for subsequent processing into a fibrous meat-type analog. The acid coagulation of the spinning solution produces fibers which are characteristically chewy, soft, and pliable similar to meat. According to this invention the protein material formed by this invention will be in substantially the same form as in the beginning which enables its subsequent use in processes and products wherein improved hydration resistance, expanion, hardness, density, or water binding capability is desired.

The high polymer material can be any polymer which has the ability to be dispersed in water at the pH conditions employed and which also has the ability to become entrapped within the alkaline treated protein material upon reduction of the slurry pH to effect change in the functional properties of the protein. Generically, the preferred high polymer materials can be described as long, straight chained combinations of a single monomer that is capable of binding to protein sites.

Typical of polymers of this type are polyvinylpyrrolidone, carboxymethylcelluloses (CMC TM), hydroxy propylcellulose (Klucel TM), methyl cellulose and polysaccharides (preferably those that have a charged monomer unit), e.g. pectic acid, pectin etc. These polymers may be used alone or in combination. Molecular weights of the order of from about 10,000 to about 450,000 have been found useful, and in the case of polyvinylpyrrolidone, molecular weight of around 360,000 has been found to provide the best results obtained to date. Any amount of polymer to effect a change in protein functionality can be employed. Levels of about 0.2% to 4% by weight of slurry appear to provide good results, but amounts outside this range can be employed under conditions where they will be effective. For polyvinylpyrrolidone, it is preferrable that levels of about 0.5% to 2% by weight of slurry appear to provide good results when using molecular weight of 360,000. It is not likely that the definition of one numerical range can be universally applied to all the possible polymers which are intended to be employed across the broad spectrum of protein substrates potentially applicable to the present invention. Accordingly, the above ranges are given only to guide the person of ordinary skill in the art to those exemplary situations which we have at this time found to be especially desirable.

After allowing sufficient time for the base and the high polymer to adequately modify the protein material and allow entry of the high polymer within the protein helix, the pH of the slurry is reduced to entrap the polymer within the protein. This can be accomplished by adding a suitable acid in an amount sufficient to reduce the pH or by mixing the treated protein with the other ingredients of the product to be made where they can reduce pH due to their acidity, buffering or dilution effect. Normally, reduction of the pH to below about pH 8 is effective, but desirably it is reduced to below about pH 7.

The most preferred acidic materials for pH reduction are those which, either alone or as the salt of the acid with the base employed for raising the pH of the slurry, form an important nutritional contribution to the final product whereby they are employed. It is of course possible to employ acid and base combinations which provide no nutrition, taste or other advantageous end result or even to employ acid/base combinations which would be deleterious in some respects; however, most desirably they will form an important nutritional contribution to the food product. Thus, where sodium hydroxide is employed as the base, hydrochloric acid can be employed as the acid portion, and these two materials together will supply the total requirement for sodium chloride necessary in a full feeding dog food. Other suitable acid/base combinations would be phosphoric acid in combination with calcium hydroxide or a combination of calcium, sodium, and/or potassium hydroxides along with a combination of hydrochloric, phosphoric or other suitable edible acid. Typical of these other acid materials are citric, acetic, and malic acids.

The treated protein material is employed in preparing the final pet food or other food product in conventional manner. In the specific instance of the dry pet food, the proteinaceous materials, farinaceous materials, and other added components are mixed together and then mechanically worked under elevated temperatures and pressures, generally in an extruder apparatus, to form an expanded porous product. Typically, the temperatures in the extruding zone are above 100° C. Steam and/or water is generally injected to control the moisture and temperature. The residence time of the mixture in the extruder is relatively short and generally on the order of 15 seconds to 120 seconds. The mixture exits the extruder into the atmosphere through an extruder die orifice. As the material issues from the die it expands into a porous expanded product due to the pressure drop across the die and the flashing off of the water as steam. The extrudate, typically in rope form, having a moisture content of about 20% to 35% by weight, is then cut into desired kib size and dried to a stable moisture content, generally about 10% and lower. A more complete discussion of the processing for the formation of dry dog foods or pet foods of this type can be found in U.S. Pat. Nos. 3,119,691, 3,139,342 and 3,447,929 which are hereby incorporated by reference.

The following examples are presented for the purpose of further illustrating and explaining the present invention and are not to be taken as limiting in any regard. Unless otherwise indicated, all parts and percentages are by weight.

EXAMPLE I

This example shows that, in certain cases, the palatability of a pet food can be improved by the process of this invention. A dry pet food is prepared from the following materials:

|  | Parts |
| --- | --- |
| Soy bean oil meal (44% protein) | 42 |
| Whole ground corn | 83 |
| Wheat midlings | 45.5 |
| Meat meal | 22 |
| Wheat Red dog | 3.78 |
| Sodium chloride | 2.6 |
| Vitamin premix | 0.05 |
| Color | 0.05 |
| Zinc oxide | 0.16 |
| Polyvinylpyrrolidone (molecular weight 360,000) | 0.55 |

About 81.5 parts of water were added to an approximately 190 liter (approximately 50 gallon) kettle with a scraped surface agitator. To this, the polyvinylpyrrolidone was added and mixed sufficiently to cause complete dispersion. The soy bean oil meal was then added to the water and mixed sufficiently to cause its dispersion. Once dispersion of the total slurry was obtained, 4 N sodium hydroxide was added until a pH of 12.0 was attained while mixing was continued. After about 30 minutes of mixing, the remainder of the formula was added to a ribbon blender and blending begun. The slurry was then added thereto and mixed for about 10 minutes. The pH of the combined mixture was 7.8. The material from the ribbon blender was collected and extruded through an Anderson expander at a temperature of approximately 107° C. (approximately 225° F.).

No water was added during the extrusion cooking step. Upon exiting the expander, the material was cut into kibbled form and run through a belt dryer held at a temperature of approximately 121° C. (approximately 250° F.) for 20 minutes. A single pass through the dryer reduced the moisture content to about 4 to 7%. The resulting dried kibbled product was then coated with bleachable fancy tallow to an amount of 3.5% based on the weight of the total product.

This product (3) was fed to a sixty dog panel to compare it to a commercial product (2) having the same formulation and processed in essentially the same manner but eliminating the pretreatment of the protein as done according to the present invention. Another control product (1) was also employed this time pretreating the protein material with base as described above but without employing the polyvinylpyrrolidone. The samples were all mixed with an equal weight of water for feeding, and the results are as follows:

(2) was no different than (1)
(3) was significantly preferred to (1)
(3) was significantly preferred to (2)

EXAMPLE II

To illustrate how the process of the present invention can be employed to increase the water binding capability of a proteinaceous material, 100 grams of soy grits was added to 300 ml of water, and mixed to form a slurry. Sodium hydroxide was added to raise the slurry pH to 12. At this point, 3 grams of polyvinylpyrrolidone (M.W. 360,000) was added and the slurry was stirred for an additional 30 minutes at 25° C. Following this, sufficient hydrochloric acid was added to reduce the slurry pH to 6.0. The solids were filtered from the slurry, washed and dried. The water activity ($a_w$) of 20% moisture-containing material was 0.82, as compared to an untreated portion of soy grits having the same moisture which had an $a_w$ of 0.93.

EXAMPLE III

To illustrate the improved expansion which can be obtained from an extruded product employing a proteinaceous material treated by the process of this invention, a pet food was prepared from the ingredients listed in Example I according to the following procedure.

About 81.5 parts of water, 3.8 parts of 3 N NaOH and 42 parts 44% soybean oil meal were added to a round bottom kettle with a scraped surface agitator. The soybean oil meal had been ground so that it passed through a 20 mesh screen. The mixture was agitated until uniform and the pH was measured. Sufficient additional NaOH was added to bring the pH to 11.5 to 12.0 and about 0.55 parts of polyvinylprolidone (M.W. 360,000) was added. Agitation was continued for an additional 30 minutes at which time the slurried mixture was added to a dry ingredient ribbon blender which contained the other dry ingredients. These other dry ingredients had also been pre-ground so that they passed through a 20 mesh screen. The mixture was blended for about 10 minutes after which the pH was about neutral (pH 6.0 to 7.0). The blended mixture was then fed to an Anderson extruder-cooker having ¼ inch (approximately 6.4 mm) die holes and 140 psig (approximately 9.8 Kg/cm² gage pressure) steam on the jacket. 80 psig (approximately 5.6 Kg/cm² gage pressure) steam was injected into the last extruder section about 6–8 inches from the orifice. The product at the die face had a temperature of approximately 121° C. (approximately 225° F.). After drying, the product had a density of about 269 Kg/m³ (about 16.8 lb/ft³) as compared to the same formulation processed in the same manner, but without pre-treatment of the soybean oil meal, which had a density of about 352–368 Kg/m³ (about 22–23 lb/ft³).

EXAMPLE IV

To illustrate the effect of process pH on the characteristics of a product employing a proteinaceous material processed in accordance with this invention, a series of pet food products were prepared according to the formulation and the process set forth in Example I, varying the slurry pH as set forth in Table I below. The products were evaluated for effect on expansion (i.e. density), rehydration rate (i.e % water uptake after 10 minutes), and hardness (after rehydration). Hardness after rehydration is increased beyond the control sample which is a desirable characteristic of dry pet food. Hardness is shown in both metric units as well as English units. Rehydration was effected by placing the sample with an equal amount of water in a dish at room temperature. Hardness was measured by an Instron pressure tester.

TABLE I

| Slurry pH | Product Density (g/c³) | Rehydration Rate (%/10 min.) | Hardness After Rehydration (Kg/m³) | After Rehydration (lb/in³) |
|---|---|---|---|---|
| 11.5 | .40 | 40.0 | 7,753 | .28 |
| 9.0 | .39 | 34.2 | 12,734 | .46 |
| 8.0 | .36 | 31.5 | 6,920 | .25 |
| Control - (pH 10 no NaOH no pvp) | .37 | 44.5 | 4,710 | .17 |

EXAMPLE V

To illustrate the effect of process temperature on the characteristics of a product employing a proteinaceous material processed in accordance with this invention, a series of pet food products was prepared according to the formulation and process set forth in Example I, varying the temperature at which the soybean oil meal is slurried at elevated pH with the polyvinylpyrrolidone. This effect is tested at slurry pH values of 8, 9 and 11.5. The results are illustrated in Table II.

TABLE II

| Slurry temp. °C. | Slurry pH | Product Density (g/c³) | Rehydration Rate (%/10 min.) | Hardness After Rehydration (Kg/m³) | After Rehydration (lb/in³) |
|---|---|---|---|---|---|
| 25 | 8.0 | .39 | 38.6 | 3,875 | .14 |
|  | 9.0 | .38 | 37.0 | 8,304 | .30 |
|  | 11.5 | .40 | 40.8 | 6,643 | .24 |
| 71 | 8.0 | .36 | 31.5 | 6,920 | .25 |
|  | 9.0 | .38 | 34.2 | 12,732 | .46 |
|  | 11.5 | .40 | 40.0 | 7,750 | .28 |

EXAMPLE VI

Based on Examples IV and V, it appears that a pH of 9, at a temperature of 71° C. provides an especially favorable increase in functional characteristics of the soybean oil meal treated with polyvinylpyrrolidone. To illustrate the effectiveness of the process of the present invention on a variety of proteinaceous materials, the tests summarized in Table III were carried out employing the formulation and procedure set forth in Example I, but employing the listed proteins at a pH of 11.5 and a temperature of 25° C. In each case, a control case was carried out wherein no pre-treatment of the protein was effected. As can be seen from the following data, hydration resistance is improved over the control. This results in a dry pet food which provides more resistance to pet mastication despite rehydration of product. It is also noted that hardness values are significantly increased over the respective control protein employed.

TABLE III

| Protein | Product Density (g/c³) | Rehydration Rate (%/10 min.) | Hardness After Rehydration (lb/in³) | Hardness After Rehydration (Kg/m³) |
|---|---|---|---|---|
| Meat Meal | .33 | 38 | .25 | 6,920 |
| Control Meat Meal | .33 | 49.7 | .10 | 2,768 |
| Corn Gluten Meal | .32 | 30.3 | 1.23 | 34,045 |
| Control Corn Gluten Meal | .33 | 49.7 | .10 | 2,768 |
| Feather Meal | .36 | 50.5 | .60 | 16,607 |
| Control Feather Meal | .33 | 49.7 | .10 | 2,768 |

EXAMPLE VII

To illustrate the effectiveness of the process of the present invention employing a variety of different polymers, the tests summarized in Table IV were carried out employing the formulation and procedure set forth in Example I, but employing the listed polymers at a pH of 11.5 and a temperature of 25° C. From this table, the affect of product density can be observed.

TABLE IV

| Polymer Type | Mol. Wt. | Product Density (g/c³) | Rehydration Rate (%/10 min.) | Hardness After Rehydration (Kg/m³) | Hardness After Rehydration (lb/in³) |
|---|---|---|---|---|---|
| PVP | 360,000 | .37 | 38.9 | 13,286 | .48 |
|  | 10,000 | .36 | 40.9 | 4,705 | .17 |
|  | 300 | .37 | 47.5 | 4,429 | .16 |
| Klucel | 360,000 | .34 | 44.6 | 5,536 | .20 |
| CMC 9M31F | 360,000 | .36 | 38.3 | 4,705 | .17 |
| Control |  | .34 | 37.6 | 7,750 | .28 |

EXAMPLE VIII

To illustrate the effect of reaction time on the process of the invention a number of pet food samples were prepared from the formulation and according to the procedure of Example I varying the time the protein slurry, having the polyvinylpyrrolidone added thereto, is maintained at various elevated pH values and temperatures. The results are summarized in Table V below.

TABLE V

| Reaction Time (min.) | Slurry Temp. (°C.) | Slurry pH | Product Density (g/c³) | Rehydration Rate (%/10 min.) | Hardness After Rehydration (lb/in³) | Hardness After Rehydration (Kg/m³) |
|---|---|---|---|---|---|---|
| 20 | 25 | 8.0 | .39 | 33.5 | .40 | 11,072 |
|  |  | 9.0 | .39 | 28.0 | — | — |
|  |  | 11.5 | .40 | 37.5 | .76 | 21,030 |
|  | 71 | 8.0 | .34 | 34.3 | .24 | 6,643 |
|  |  | 9.0 | .39 | 32.8 | .28 | 7,750 |
|  |  | 11.5 | .37 | 40.4 | .21 | 5,813 |
| 40 | 25 | 8.0 | .39 | 38.6 | .14 | 3,875 |
|  |  | 9.0 | .38 | 37.0 | .30 | 8,304 |
|  | 25 | 11.5 | .40 | 40.8 | .24 | 6,643 |
|  | 71 | 8.0 | .36 | 34.5 | .25 | 6,920 |
|  |  | 9.0 | .38 | 34.2 | .46 | 12,732 |
|  |  | 11.5 | .40 | 40.0 | .28 | 7,750 |
| Control |  |  | .37 | 37.5 | .17 | 4,705 |

EXAMPLE IX

To illustrate the effect of different bases employed for pH adjustment, pet food samples are prepared from the formulation and according to the procedure of Example I, changing only the type of base employed. The results are summarized in Table VI below.

It has been found that when the reduction of the pH of the solution is to be effected by mixing the treated protein with other ingredients of the product, the use of calcium hydroxide as the base used to increase the pH of the solution significantly increases the hardness of the product of the invention as compared to using sodium hydroxide. However, it has also been found that if the reduction of the pH of the solution is to be effected by the adding of a suitable acid, the use of sodium hydroxide as the base used to increase the pH of the solution significantly increases the hardness of the product of this invention as compared to using calcium hydroxide.

TABLE VI

| Base | NaCl % | Slurry pH | Product Density (g/c³) | Rehydration Rate (%/10 min.) | Hardness After Rehydration (lb/in³) | Hardness After Rehydration (Kg/m³) |
|---|---|---|---|---|---|---|
| NaOH | 2.0 | 11.5 | .34 | 43.5 | .31 | 8,581 |
| Ca(OH)2 | 2.0 | 11.5 | .29 | 28.0 | .40 | 11,072 |

The above description is for the purpose of teaching those skilled in the are how to practice the present invention and is not intended to detail all those modifications and variations of the present invention which would become apparent to the person of ordinary skill in the art upon reading the disclosure. It is intended, however, that all such obvious modifications and variations be included within the scope of the present invention which is defined by the following claims.

What is claimed is:

1. A method for improving the functionality of a protein material comprising the steps of:
   (a) forming a non-solubilized, mixable, aqueous protein slurry composed of helical protein molecules, said slurry having greater than 20% solids concentration;

(b) mixing polyvinylpyrrolidone with said slurry, said mixing being effective to cause complete dispersion of said polyvinylpyrrolidone in said slurry;

(c) raising the pH of the slurry to within the alkaline range of from about 8 to about 14 and maintaining contact between the protein and the polyvinylpyrrolidone for a period of time effective to allow ingress of the polyvinylpyrrolidone internally in the helical protein molecules, and thereafter;

(d) reducing the pH of the slurry to the range of from about pH 5 to less than pH 8 in order to entrap a portion of the polyvinylpyrrolidone within the helical protein molecules.

2. The method of claim 1 wherein the protein will comprise 10% to 50% by weight of the slurry.

3. The method of claim 2 wherein the solids concentration of the slurry will be greater than 40% by weight of the slurry.

4. The method of claim 3 wherein the raising of the pH of the slurry is in the range from pH 8 to pH 12.

5. The method of claim 4 wherein the raising of the pH of the slurry is in the range from pH 9 to pH 10.

6. The method of claim 1 wherein the polyvinylpyrrolidone has a molecular weight of about 360,000.

7. The method of claim 6 wherein the level of polyvinylpyrrolidone used to effect the change in the protein functionality is in the range from 0.2% to 4% by weight of the slurry.

8. The method of claim 1 wherein the reduction of the pH in the slurry of step (d) is effected by adding polyvinylpyrrolidone ingredients used in the formulation of a pet food.

* * * * *